(12) United States Patent
Shapir (10) Patent No.: US 11,890,688 B1
(45) Date of Patent: Feb. 6, 2024

(54) ROTARY CUTTING TOOL HAVING AN INTEGRALLY FORMED AXIAL ADJUSTMENT TONGUE

(71) Applicant: ISCAR, LTD., Tefen (IL)

(72) Inventor: Adi Shapir, Zurit (IL)

(73) Assignee: Iscar, Ltd., Tefen (IL)

( * ) Notice: Subject to any disclaimer, the term of this patent is extended or adjusted under 35 U.S.C. 154(b) by 64 days.

(21) Appl. No.: 17/880,782

(22) Filed: Aug. 4, 2022

(51) Int. Cl.
  *B23C 5/24* (2006.01)
  *B23C 5/08* (2006.01)
  *B23C 5/22* (2006.01)

(52) U.S. Cl.
  CPC .............. *B23C 5/2472* (2013.01); *B23C 5/08* (2013.01); *B23C 5/2234* (2013.01); *B23C 2200/0455* (2013.01); *B23C 2200/367* (2013.01); *B23C 2210/02* (2013.01); *B23C 2210/246* (2013.01)

(58) Field of Classification Search
  CPC ....... B23C 5/2472; B23C 5/08; B23C 5/2234; B23C 2200/367; B23C 2200/0455; B23C 2210/02; B23C 2210/246; B23C 5/22; B23C 5/2489; B23C 5/2493; B23C 5/24; B23C 2245/00; B23C 2260/04; Y10T 407/1912
  See application file for complete search history.

(56) References Cited

U.S. PATENT DOCUMENTS

| | | | | |
|---|---|---|---|---|
| 3,616,507 A | * | 11/1971 | Wirfelt | B23C 5/202 |
| | | | | 407/120 |
| 3,675,290 A | * | 7/1972 | Mayer | B23C 5/2278 |
| | | | | 407/46 |

(Continued)

FOREIGN PATENT DOCUMENTS

| | | | | |
|---|---|---|---|---|
| DE | 102015100646 A1 | * | 7/2015 | ............. B23C 5/202 |
| JP | 2008-155352 | | 7/2008 | |

(Continued)

OTHER PUBLICATIONS

International Search Report dated Oct. 25, 2023, issued in PCT counterpart application No. PCT/IL2023/050687.

(Continued)

*Primary Examiner* — Sara Addisu
(74) *Attorney, Agent, or Firm* — Womble Bond Dickinson (US) LLP (57) ABSTRACT

A rotary cutting tool has an insert receiving pocket with a cutting insert removably secured therein and an adjustment recess rearward thereof having a radially outward facing recess side surface and an adjustment tongue spaced apart therefrom by a first inner passage. The adjustment tongue extends rearwardly from a tongue root to a tongue tip and includes a tongue through bore. The tongue root has a shoulder surface facing in the forward direction and the cutting insert is in contact with the shoulder surface. An adjustment screw extends through the tongue through bore and engages the recess side surface, and rotation of the adjustment screw causes axial displacement of the cutting insert in a forward direction. An imaginary straight line in the first inner passage intersects a recess rear end surface formed on a first body sub-portion of the cutting body which is integrally formed with the adjustment tongue.

21 Claims, 6 Drawing Sheets

(56) References Cited

U.S. PATENT DOCUMENTS

| | | | |
|---|---|---|---|
| 4,428,704 A * | 1/1984 | Kalokhe | B23B 29/03421 407/89 |
| 5,336,026 A * | 8/1994 | Noggle | B23B 29/03421 408/180 |
| 5,704,742 A | 1/1998 | Reinauer | |
| 6,056,484 A * | 5/2000 | Mitchell | B23C 5/2493 407/41 |
| 6,511,264 B2 * | 1/2003 | Ripley | B23C 5/2493 407/43 |
| 7,682,108 B2 | 3/2010 | Satran et al. | |
| 8,091,205 B2 * | 1/2012 | Kadosh | B23C 5/08 407/39 |
| 8,092,124 B2 * | 1/2012 | Spichtinger | B23C 5/2462 407/46 |
| 8,388,270 B2 * | 3/2013 | Waggle | B23C 5/2265 407/109 |
| 8,556,545 B2 | 10/2013 | Chen et al. | |
| 8,851,807 B2 | 10/2014 | Mokthar | |
| 9,211,596 B2 * | 12/2015 | Hecht | B23C 5/22 |
| 9,475,138 B2 * | 10/2016 | Morrison | B23C 5/202 |
| 9,636,759 B2 * | 5/2017 | Buob | B23C 5/2226 |
| 10,183,347 B2 | 1/2019 | Serbutovsky | |
| 11,458,553 B2 * | 10/2022 | Kondou | B23C 5/2226 |
| 2003/0123938 A1 * | 7/2003 | Grehn | B23C 5/2493 407/36 |
| 2004/0191008 A1 * | 9/2004 | Noggle | B23C 5/2226 407/46 |
| 2013/0294849 A1 * | 11/2013 | Heinloth | B23C 5/20 407/45 |
| 2015/0209867 A1 * | 7/2015 | Woerner | B23C 5/2472 407/77 |

FOREIGN PATENT DOCUMENTS

| | | |
|---|---|---|
| JP | 2013-111699 | 6/2013 |
| TW | M424204 U1 | 3/2012 |

OTHER PUBLICATIONS

Written Opinion dated Oct. 25, 2023, issued in PCT counterpart application No. PCT/IL2023/050687.

* cited by examiner

ROTARY CUTTING TOOL HAVING AN INTEGRALLY FORMED AXIAL ADJUSTMENT TONGUE

FIELD OF THE INVENTION

The present invention relates to a rotary cutting tool having axial adjustment means, for use in metal cutting processes in general, and for milling operations in particular.

BACKGROUND OF THE INVENTION

Within the field of rotary cutting tools used in milling operations, there are many examples of cutting bodies having at least one insert receiving pocket and a cutting insert removably secured therein, whereby a means for adjusting the axial position of the cutting insert is provided.

U.S. Pat. No. 6,056,484 discloses a device for adjusting the position of a cutting insert relative to the body of a cutting tool such as a milling cutter. The device includes a cantilevered wall integrally connected to the tool body, that forms a portion of the pocket in the tool body that supports a side of the insert, and a wedge mechanism for elastically flexing the cantilevered wall to adjust the position of a cutting edge of the insert relative to the tool body. The wedge mechanism may take the form of a screw threadedly engaged to the tool body that has a conical head engaged against the cantilevered wall such that when the screw is turned, the conical wedge formed by the screw head flexes the cantilevered wall a small distance. The device advantageously allows fine adjustments to be made in the position of the cutting edge of an insert by the simple turning of a single screw.

JP 2008-155352 discloses a cutting edge adjusting mechanism composed of, an adjusting member having a clearance between a cutter body and the adjusting member; a connecting member fixing the adjusting member to the cutter body; and an adjusting screw applying force to an input part of the adjusting member. The thrust force of the adjusting screw moves the input part in the axial direction of the adjusting screw to apply elastic deformation to the adjusting member around the connecting member so that a cutting edge replaceable tip can be positioned on the displaced end face of the adjusting member.

U.S. Pat. No. 9,475,138 discloses a cutting tool having a central, longitudinal axis and a tool body including an insert pocket with a bottom wall, a rear wall and at least one side wall. A cantilevered member is machined from the tool body so as to be integrally formed with the tool body. The cantilevered member extends from one of the walls of the insert pocket. An adjustment screw exerts a force against the cantilevered member to selectively adjust a position of a cutting insert mounted on the cantilevered member with respect to the central, longitudinal axis of the cutting tool.

It is an object of the present invention to provide an improved rotary cutting tool having axial adjustment means.

It is also an object of the present invention to provide an improved rotary cutting tool with a minimized risk of cutting chips obstructing the axial adjustment means.

It is a further object of the present invention to provide an improved rotary cutting tool with a reduced number of cutting body components.

SUMMARY OF THE INVENTION

In accordance with the present invention, there is provided a rotary cutting tool rotatable about a tool axis in a direction of rotation, the tool axis defining a forward-to-rearward direction, and comprising:

a cutting body having a forward envelope surface and at least one insert receiving pocket formed in the forward envelope surface, the insert receiving pocket opening out at a body forward end of the cutting body and having a cutting insert removably secured therein, the forward envelope surface also having an adjustment recess located axially rearward of the insert receiving pocket, the adjustment recess including a radially outward facing recess side surface and an adjustment tongue extending axially rearwardly from a tongue root to a tongue tip, the adjustment tongue being spaced apart from the recess side surface by a first inner passage, and the tongue root having a shoulder surface facing in the forward direction and a pivot axis, and the adjustment tongue also having opposing radially inner and radially outer tongue side surfaces, and a tongue through bore extending therebetween intersecting the radially inner and radially outer tongue side surfaces, and wherein:
the cutting insert is in clamping contact with the shoulder surface;
an adjustment screw having an adjustment axis extends through the tongue through bore, traverses the first inner passage, and engages the recess side surface; and
rotation of the adjustment screw in a first adjustment direction about the adjustment axis causes rotational displacement of the adjustment tongue about the pivot axis and axial displacement of the cutting insert in the forward direction, and wherein:
in a cross-section of the cutting tool taken in a radial plane containing the tool axis and intersecting the adjustment tongue, the first inner passage has an imaginary first straight line disposed between the recess side surface and the tongue's radially inner side surface, and the imaginary first straight line intersects a recess rear end surface located axially rearward of the tongue's radially inner side surface,
the recess rear end surface is formed on a first body sub-portion of the cutting body, and
the adjustment tongue is integrally formed with the first body sub-portion to have unitary one-piece construction therewith.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Attention is first drawn to FIGS. 1 to 5, showing a rotary cutting tool 20 according to the present invention.

The rotary cutting tool 20 is rotatable about a tool axis AT in a direction of rotation RD, the tool axis AT defining a forward-to-rearward direction DF, DR.

As shown in FIGS. 1 to 5, the rotary cutting tool 20 includes a rotary cutting body 22 having a forward envelope surface 24 and at least one insert receiving pocket 26 formed in the forward envelope surface 24. The insert receiving pocket 26 opens out at a forward body end 28 of the cutting body 22 and has a cutting insert 30 removably secured therein.

It is understood that the rotary cutting tool 20 and the cutting body 22 have the tool axis AT and the directions of rotation DF, DR in common, and so the tool axis AT can also be considered a body axis of the cutting body 22.

In some embodiments of the present invention, the cutting body 22 may preferably be manufactured from tool steel, and the cutting insert 30 may preferably be manufactured from cemented carbide.

Also, in some embodiments of the present invention, the forward envelope surface 24 may be cylindrical.

Further, in some embodiments of the present invention, the rotary cutting tool 20 may be used for milling operations.

Figure 4:
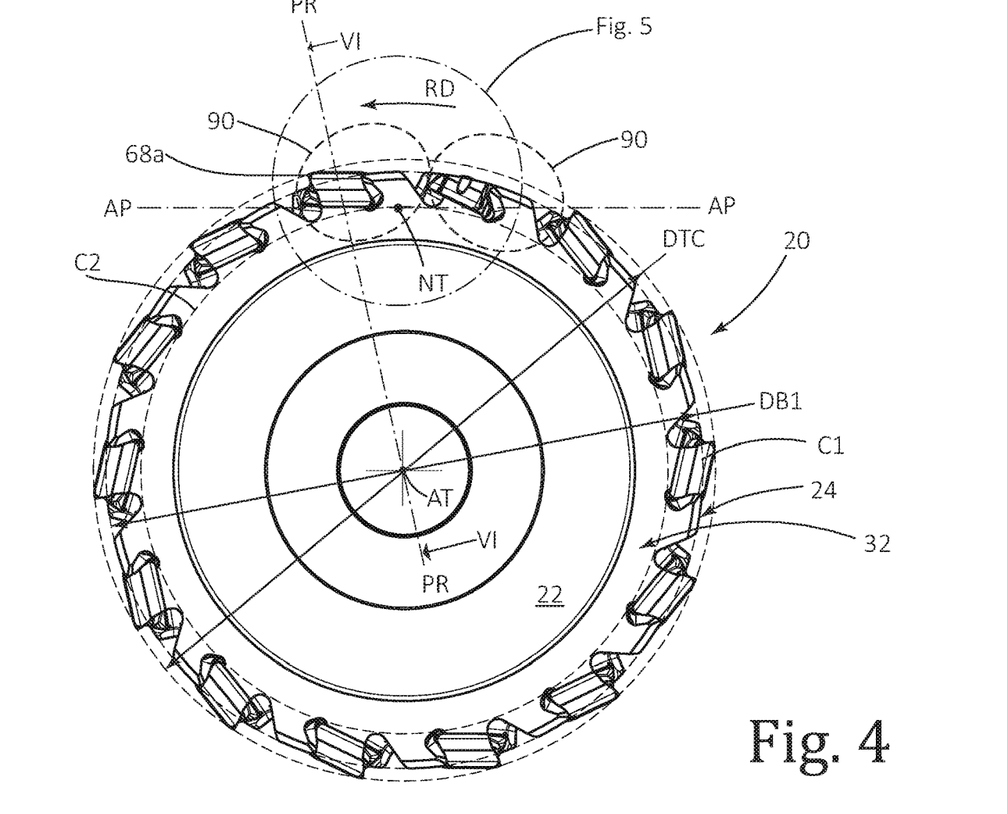
FIG. 4 is a front end view of the cutting tool shown in FIG. 1.

As shown in FIG. 4, the forward body end 28 may have an annular shaped forward body end surface 32.

In some embodiments of the present invention, the forward body end surface 32 may define a body plane PB perpendicular to the tool axis AT.

As shown in FIGS. 1 to 5, the insert receiving pocket 26 may have a radially outward facing first support surface 34, and a second support surface 36 transverse to the first support surface 34 facing in the direction of rotation RD.

In some embodiments of the present invention, the first support surface 34 may be planar.

As shown in FIG. 4, in an end view of the cutting body 22, the forward envelope surface 24 may define an imaginary first circle C1 having a first body diameter DB1.

In some embodiments of the present invention, the imaginary first circle C1 may have a center point coincident with the tool axis AT.

Figure 1:
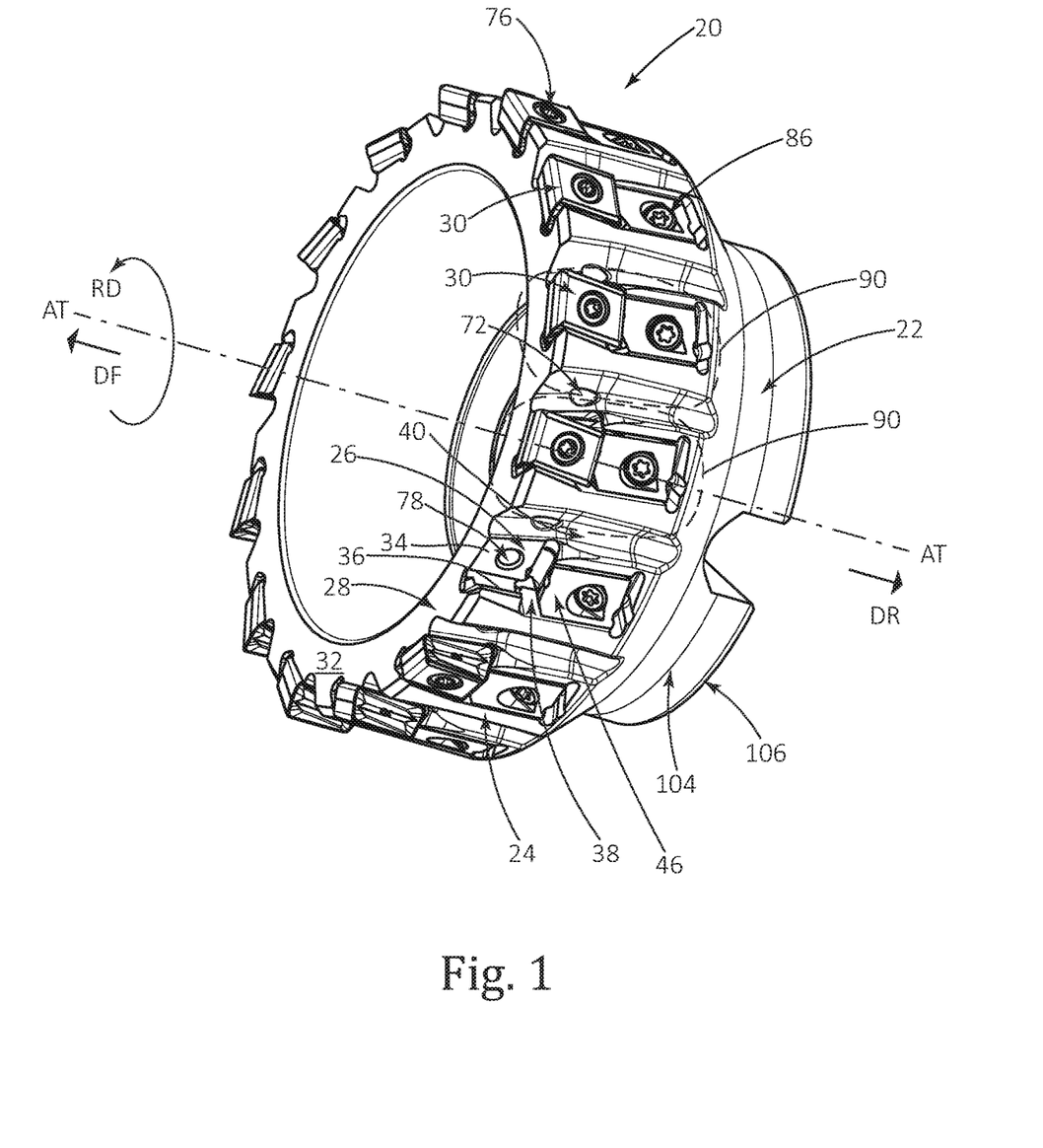
FIG. 1 is a perspective view of a rotary cutting tool in accordance with some embodiments of the present invention, with one of a plurality of cutting inserts and its associated clamping screw removed.
Figure 2:
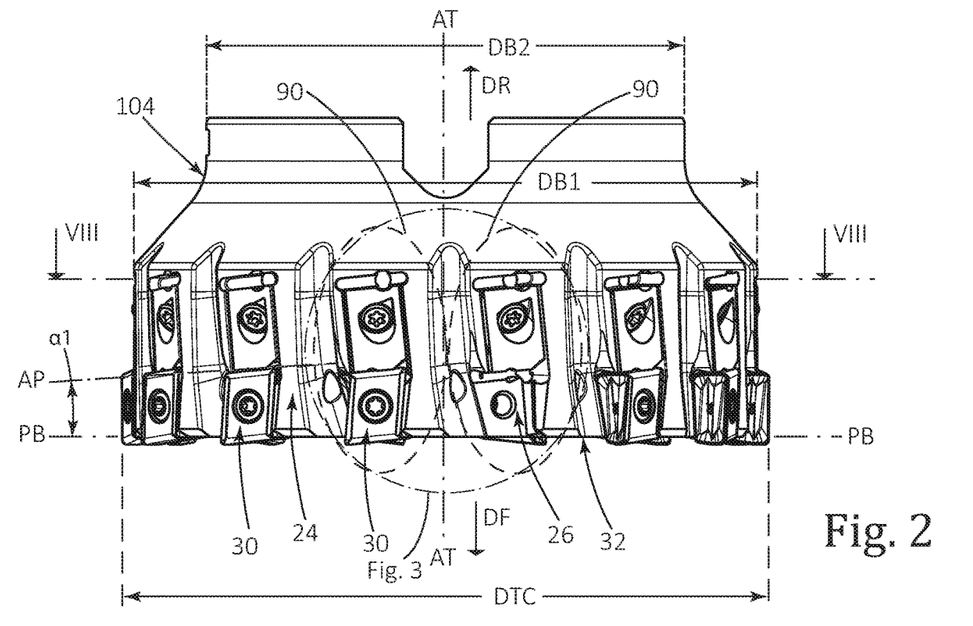
FIG. 2 is a side view of the cutting tool shown in FIG. 1.
Figure 3:
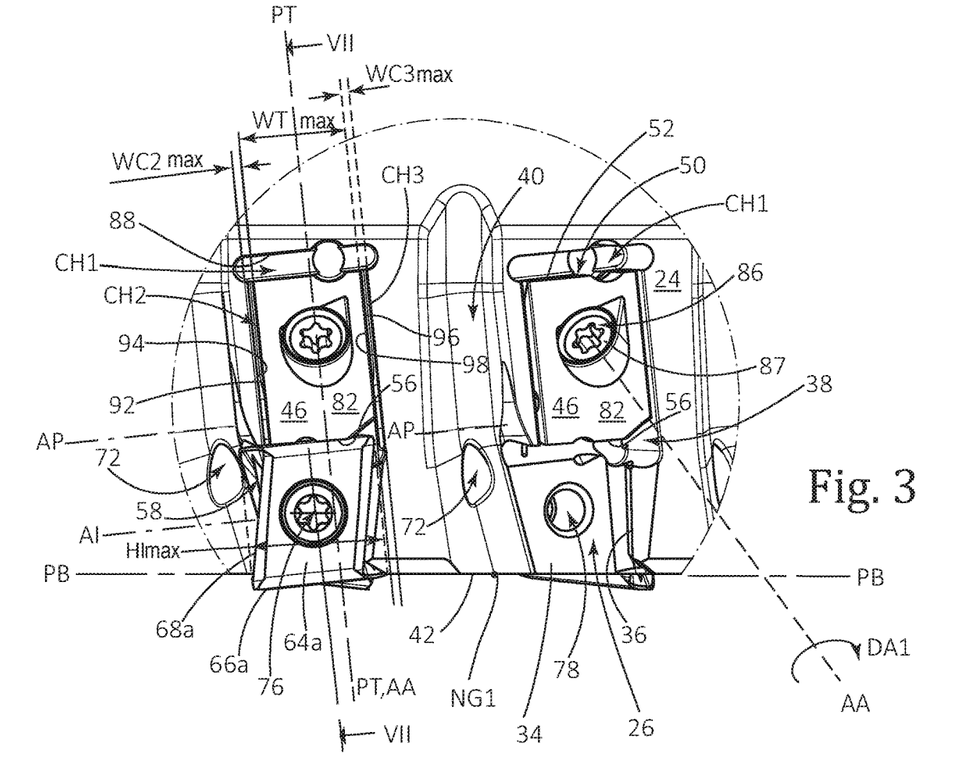
FIG. 3 is a detailed view of the cutting tool shown in FIG. 2.

As shown in FIGS. 1 to 3, the forward envelope surface 24 has an adjustment recess 38 located axially rearward of the insert receiving pocket 26.

As shown in FIGS. 1 to 5, the forward envelope surface 24 may have a chip gullet 40 located rotationally ahead of the insert receiving pocket 26, and the chip gullet 40 may communicate with the insert receiving pocket 26 and open out at the forward body end 28.

In some embodiments of the present invention, the chip gullet 40 may be recessed in the forward envelope surface 24 and rotationally spaced apart from the adjustment recess 38, such that the chip gullet 40 does not directly communicate with the adjustment recess 38. For such embodiments of the present invention, it should be appreciated that the chip gullet 40 may overlap the adjustment recess 38 in a rotational projection about the tool axis AT.

Figure 5:
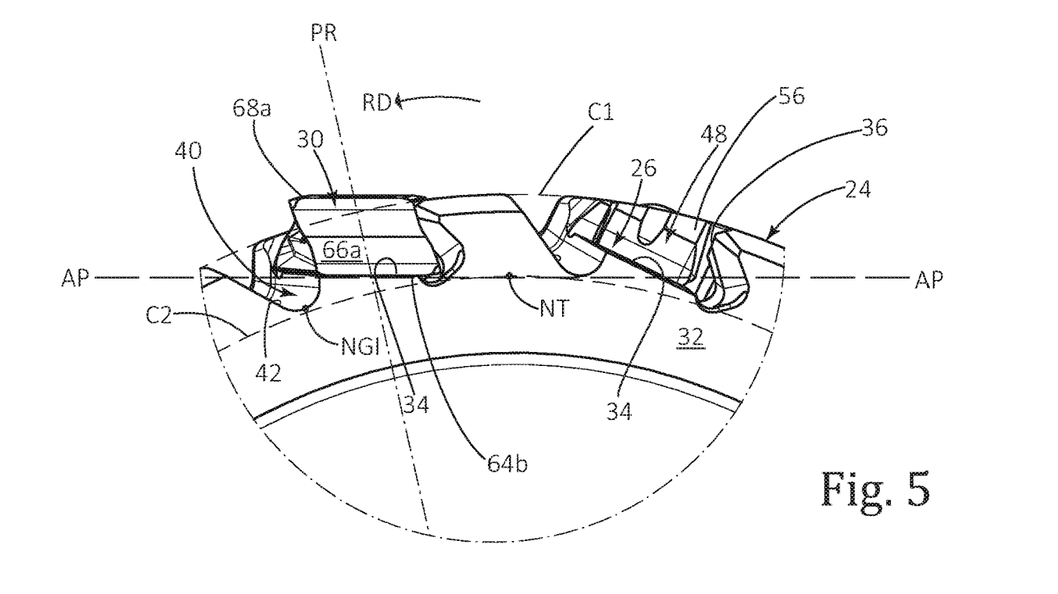
FIG. 5 is a detailed view of the cutting tool shown in FIG. 4.

Also, in some embodiments of the present invention, as shown in FIG. 5, the chip gullet 40 may have a radially innermost gullet point NGI located closer to the tool axis AT than any point on the insert receiving pocket's first support surface 34.

Further, in some embodiments of the present invention, as shown in FIG. 5, a forward gullet edge 42 may be formed at the intersection of the chip gullet 40 and the forward body end 28, and the radially innermost gullet point NGI may be located along the forward gullet edge 42.

The adjustment recess 38 includes a radially outward facing recess side surface 44 and an adjustment tongue 46 extending axially rearwardly from a tongue root 48 to a tongue tip 50. Thus, the adjustment tongue 46 is cantilevered principally in the rearward direction DR.

In some embodiments of the present invention, the tongue tip 50 may have a free-end distal from the tongue root 48.

Also, in some embodiments of the present invention, the tongue tip 50 may have a tip surface 52 facing in the rearward direction DR.

For embodiments of the present invention in which the adjustment recess 38 and its adjustment tongue 46 are located axially rearward of the insert receiving pocket 26, it should be appreciated that an advantageously small circumferential extent of the cutting body's forward envelope surface 24 is required to provide such an arrangement. Indeed, as shown in FIGS. 2 to 5, the adjustment recess 38 extends farther in the rearward direction DR from the insert receiving pocket 26, than in either the circumferential direction (e.g., RD) or the radially inward direction.

In some embodiments of the present invention, the recess side surface 44 may extend radially outwardly as it extends axially rearwardly.

Also, in some embodiments of the present invention, the recess side surface 44 may be planar.

As shown in FIGS. 6 to 9, the adjustment tongue 46 is spaced apart from the recess side surface 44 by a first inner passage 54, and the tongue root 48 has a shoulder surface 56 facing in the forward direction DF and a pivot axis AP.

The adjustment tongue 46 is rotationally displaceable about the pivot axis AP.

In some embodiments of the present invention, the pivot axis AP may be parallel to the first support surface 34.

As shown in FIGS. 2 and 3, the pivot axis AP may be inclined with respect to the body plane PB.

In some embodiments of the present invention, the pivot axis AP may form an acute pivot angle α1 of less than fifteen degrees with the body plane PB, i.e., α1≤15°.

As indicated in FIGS. 4 and 5, in an end view projection of the cutting body 22, the pivot axis AP may be tangential to an imaginary second circle C2 having a center point coincident with the tool axis AT, and the point of tangency NT between the pivot axis AP and the imaginary second circle C2 may be located rotationally behind the associated adjustment tongue 46.

Figure 10:
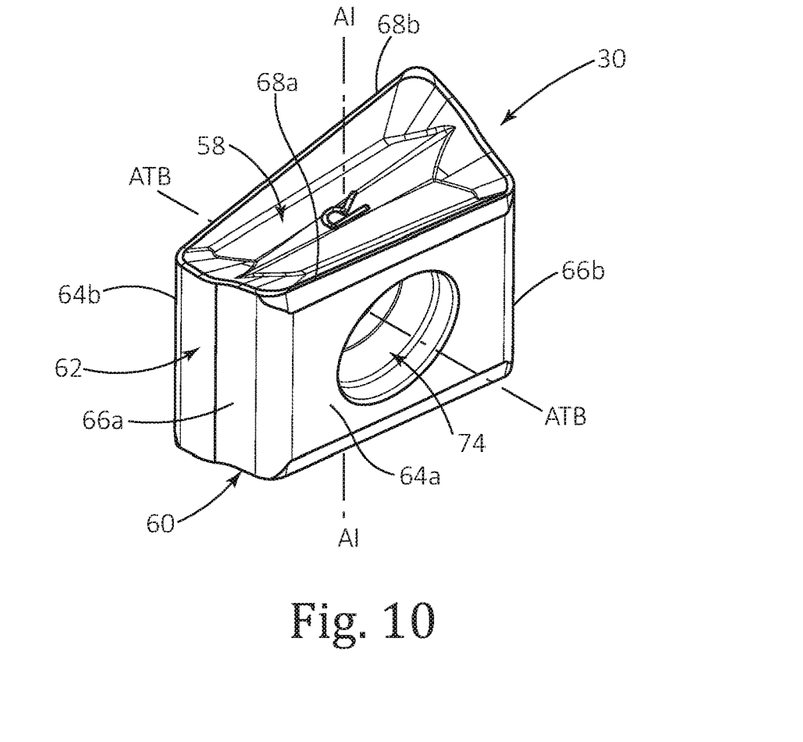
FIG. 10 is a perspective view of one of the plurality of cutting inserts shown in FIG. 1.
Figure 11:
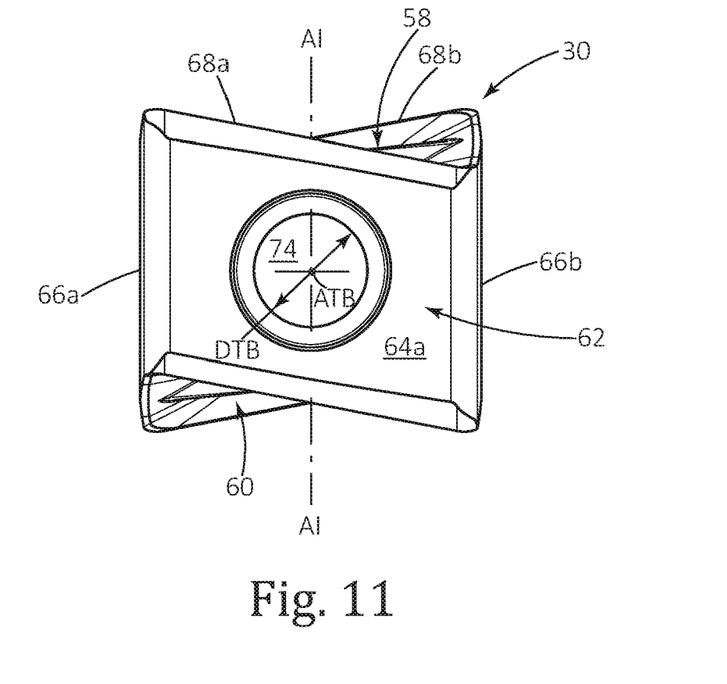
FIG. 11 is a side view of the cutting insert shown in FIG. 10.

As shown in FIGS. 10 and 11, the cutting insert 30 may have opposing first and second insert end surfaces 58, 60 interconnected by a continuous peripheral surface 62, the peripheral surface 62 having a pair of opposing first insert side surfaces 64a, 64b spaced apart by a pair of opposing second insert side surfaces 66a, 66b, and at least one cutting edge 68a, 68b formed at the intersection of the first insert end surface 58 and the first insert side surfaces 64a, 64b.

For embodiments of the present invention having a cutting edge 68a, 68b formed at the intersection of the first insert end surface 58 and each first insert side surface 64a, 64b, as shown in FIG. 10, the cutting insert 30 may be indexable about an insert axis AI extending between and intersecting the first and second insert end surfaces 58, 60.

In some embodiments of the present invention, the insert axis AI may be substantially parallel to the pivot axis AP.

Also, in some embodiments of the present invention, the first and second insert end surfaces 58, 60 may be identical.

In other embodiments of the present invention (not shown), cutting edges may be formed at the intersection of the first insert side surfaces 64a, 64b and the second insert side surfaces 66a, 66b, and the second insert side surfaces 66a, 66b and the first and second insert end surfaces 58, 60 may be identical.

As shown in FIG. 3, in a side view of the insert receiving pocket 26, the adjustment tongue 46 has a maximum tongue width $WT_{MAX}$ measured parallel to the pivot axis AP, and the cutting insert 30 has a maximum insert height $HI_{MAX}$ measured parallel to the insert axis AI.

In some embodiments of the present invention, the maximum insert height $HI_{MAX}$ may be greater than the maximum tongue width $WT_{MAX}$.

As shown in FIG. 4, the cutting insert 30 may have one operative cutting edge 68a which defines a tool cutting diameter DTC upon rotation of the cutting tool 20 about the tool axis AT, and the tool cutting diameter DTC may be greater than the first body diameter DB1.

Figure 7:
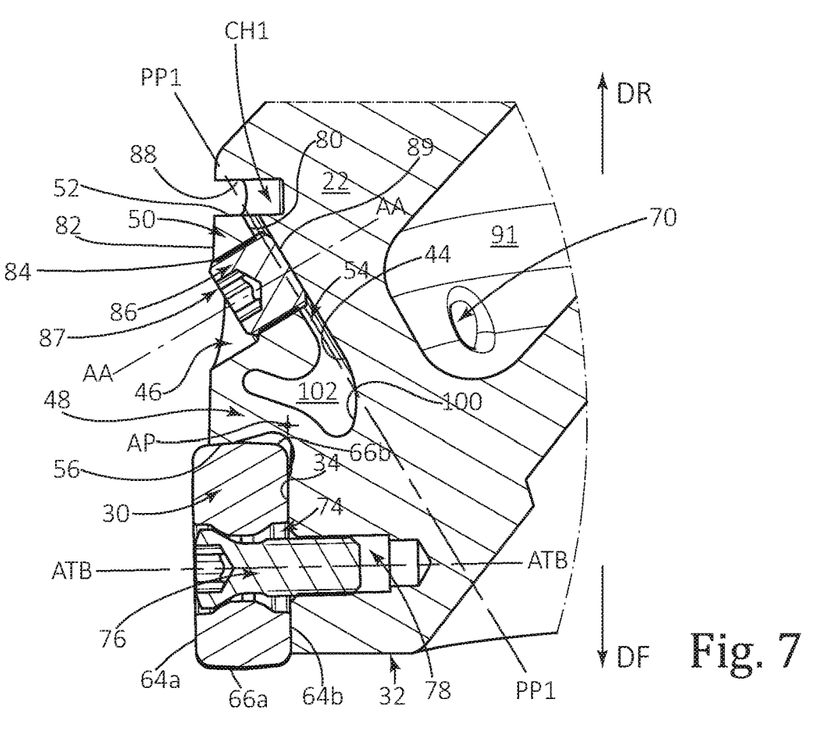
FIG. 7 is a cross-sectional view of the rotary cutting tool shown in FIG. 3, taken along the line VII-VII.
Figure 8:
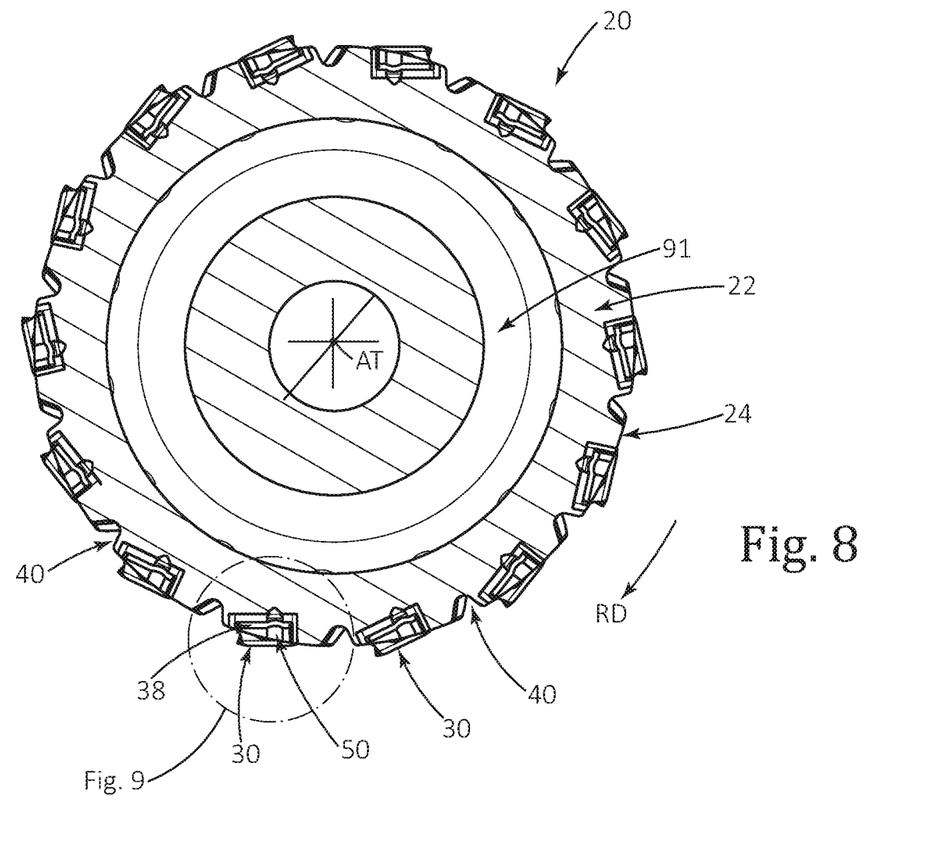
FIG. 8 is a cross-sectional view of the rotary cutting tool shown in FIG. 2, taken along the line VIII-VIII.
Figure 9:
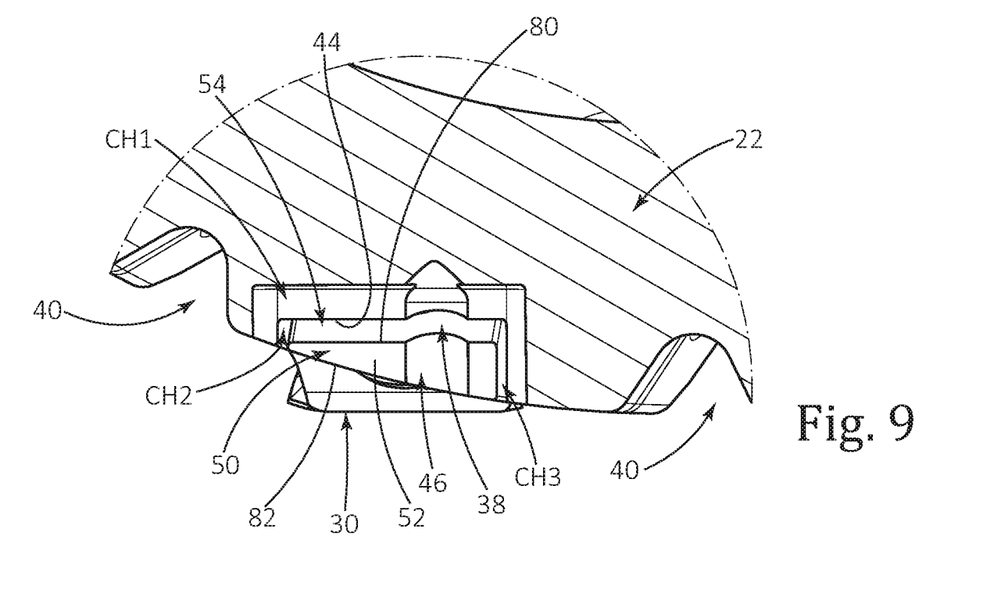
FIG. 9 is a detailed view of the rotary cutting tool shown in FIG. 8.

In some embodiments of the present invention, as shown in FIGS. 3 and 7, a coolant duct 70 may extend inside the cutting body 22 and intersect the chip gullet 40 at a coolant exit opening 72. For such embodiments of the present invention, it should be appreciated that coolant flowing through the coolant duct 70 may be directed from the coolant exit opening 72 to the cutting insert's operative cutting edge 68a.

As shown in FIGS. 10 and 11, the cutting insert 30 also includes an insert through bore 74 having a through axis ATB and a through bore diameter DTB.

In some embodiments of the present invention, the insert through bore 74 may extend between and intersect the first insert side surfaces 64a, 64b, and in other embodiments of the present invention (not shown), the insert through bore 74 may extend between and intersect the first and second insert end surfaces 58, 60.

For embodiments of the present invention in which the insert through bore 74 intersects the first insert side surfaces 64a, 64b, the cutting insert 30 may be described as a tangential cutting insert. For such embodiments of the present invention, the through bore axis ATB may be perpendicular to the insert axis AI, and the cutting insert 30 may be indexable about the through bore axis ATB.

For embodiments of the present invention in which the insert through bore 74 intersects the first and second insert end surfaces 58, 60 (not shown), the cutting insert 30 may be described as a radial cutting insert.

In some embodiments of the present invention, the cutting insert 30 may be clamped in the insert receiving pocket 26 by a clamping screw 76 extending through the insert through bore 74 and threadingly engaging a threaded bore 78 in the insert receiving pocket 26.

As shown in FIGS. 3 and 5, one of the first insert side surfaces 64a, 64b may be in clamping contact with the first support surface 34, and the second insert end surface 60 may be in clamping contact with the second support surface 36.

For embodiments of the present invention in which the insert through bore 74 intersects the first insert side surfaces 64a, 64b, the threaded bore 78 may be disposed in the first support surface 34.

For embodiments of the present invention in which the insert through bore 74 intersects the first and second insert end surfaces 58, 60 (not shown), the threaded bore 78 may be disposed in second support surface 36.

As shown in FIGS. 3 and 5, the shoulder surface 56 is transverse to the first support surface 34, and one of the second insert side surfaces 66a, 66b is in clamping contact with the shoulder surface 56.

Figure 6:
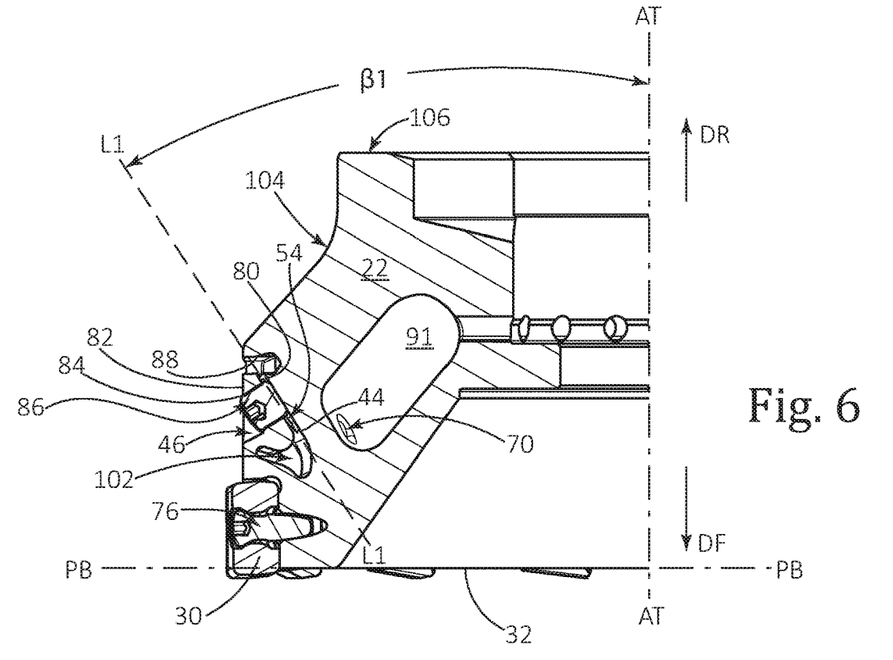
FIG. 6 is a cross-sectional view of the cutting tool shown in FIG. 4, taken along the line VI-VI.

As shown in FIGS. 6 and 7, the adjustment tongue 46 has opposing radially inner and radially outer tongue side surfaces 80, 82, and a tongue through bore 84 extending therebetween intersecting the radially inner and radially outer tongue side surfaces 80, 82.

In some embodiments of the present invention, the tongue through bore 84 may located between the tongue root 48 to a tongue tip 50.

Also, in some embodiments of the present invention, the tongue through bore 84 may extend axially rearwardly as it extends from the radially outer surface 82 to the radially inner surface 80, and this may apply across the range of rotational displacements of the adjustment tongue 46 about the pivot axis AP.

As shown in FIG. 6, the adjustment tongue's radially inner surface 80 may face radially inwardly, and the adjustment tongue's radially outer surface 82 may face radially outwardly.

In some embodiments of the present invention, the tongue's radially inner side surface 80 may be planar.

As shown in FIG. 7, an adjustment screw 86 having an adjustment axis AA extends through the tongue through bore 84, traverses the first inner passage 54, and engages the recess side surface 44.

In some embodiments of the present invention, a first screw end 87 of the adjustment screw 86 may have a screw socket to enable a torque key (not shown) to engage and rotate the adjustment screw 86 about the adjustment axis AA.

Rotation of the adjustment screw 86 in a first adjustment direction DA1 about the adjustment axis AA causes rotational displacement of the adjustment tongue 46 about the pivot axis AP and axial displacement of the cutting insert 30 in the forward direction DF. More particularly, rotational displacement of the adjustment tongue 46 about the pivot axis AP in a first pivot direction widens the first inner passage 44, resulting in axial displacement of the shoulder surface 56 and thus also the cutting insert 30, in the forward direction DF.

It should be appreciated that the clamping screw 76 may provide the necessary elasticity for axial displacement of the cutting insert 30 when an adjustment force is applied thereto by the adjustment tongue's shoulder surface 56.

In some embodiments of the present invention, the adjustment tongue 46 may be resiliently displaceable about the pivot axis AP.

Also, in some embodiments of the present invention, the tongue through bore 84 may be threaded, and the adjustment screw 86 may threadingly engage the tongue through bore 84 and non-threadingly engage the recess side surface 44. For such embodiments of the present invention, it should be appreciated that a second screw end 89 of the adjustment screw 86, axially opposite the first screw end 87 along the adjustment axis AA, may abuttingly engage the recess side surface 44.

For embodiments of the present invention in which the tongue through bore 84 extends axially rearwardly as it extends from the radially outer surface 82 to the radially inner surface 80, it should be appreciated that the cutting insert 30 may be clamped against the adjustment tongue's shoulder surface 56 with a high level of stability and good resistance to axial cutting forces.

In some embodiments of the present invention, it should be appreciated that before and after rotation of the adjustment screw 86 in the first adjustment direction DA1, no portion of the adjustment tongue 46 may be located radially outside an imaginary cylinder defined by the first body diameter DB1.

As shown in FIG. 6, in a cross-section of the cutting tool 20 taken in a radial plane PR containing the tool axis AT and intersecting the adjustment tongue 46, the first inner passage 54 has an imaginary first straight line L1 disposed between the recess side surface 44 and the tongue's radially inner side surface 80, and the imaginary first straight line L1 intersects a recess rear end surface 88 located axially rearward of the tongue's radially inner side surface 80. For such embodiments of the present invention, it should be appreciated that the imaginary first straight line L1 does not intersect the recess side surface 44 and the tongue's radially inner side surface 80.

As shown in FIG. 6, in the cross-section of the cutting tool 20 taken in the radial plane PR, the imaginary first straight line L1 may diverge away from the tool axis AT in the rearward direction DR.

Also, as shown in FIG. 6, in the cross-section of the cutting tool 20 taken in the radial plane PR, the imaginary first straight line L1 may form an acute recess angle β1 with the tool axis AT.

In some embodiments of the present invention, the recess angle β1 may have a range from ten to forty-five degrees, i.e., $10° \leq \beta 1 \leq 45°$.

In some embodiments of the present invention, the radial plane PR may intersect the tongue through bore 84.

For embodiments of the present invention in which the threaded bore 78 is disposed in the second support surface 36, the radial plane PR may intersect the insert through bore 74 and the threaded bore 78.

In some embodiments of the present invention, the recess rear end surface 88 may be transverse to the recess side surface 44.

In other embodiments of the present invention (not shown), the recess rear end surface 88 may intersect the recess side surface 44.

As indicated in FIGS. 6 to 9, in an end view projection of the cutting body 22, the recess rear end surface 88 may overlap the tongue's tip surface 52.

In some embodiments of the present invention, the recess rear end surface 88 may intersect the forward envelope surface 24. For such embodiments of the present invention, it should be appreciated that the cylindrical forward envelope surface 24 with its first body diameter DB1 may extend axially rearwardly from the forward body end 28 to at least the recess rear end surface 88, advantageously providing the cutting body 22 with a high level of rigidity, which is particularly important for rotary cutting tools 20 having extended lengths or rotary cutting tools 20 assembled to adaptors having extended lengths.

In some embodiments of the present invention, a first passage plane PP1 may be disposed between the recess side surface 44 and the tongue's radially inner side surface 80. For such embodiments of the present invention, it should be appreciated that the first passage plane PP1 does not intersect the recess side surface 44 and the tongue's radially inner side surface 80.

Also, in some embodiments of the present invention, the imaginary first straight line L1 may be contained in the first passage plane PP1.

Attention is drawn to FIG. 7, which shows a cross-section of the cutting tool 20 taken in a tongue plane PT perpendicular to the pivot axis AP and intersecting the adjustment tongue 46 and the first passage plane PP1.

In some embodiments of the present invention, the tongue plane PT may be perpendicular to the first passage plane PP1.

As indicated in FIGS. 3 and 7, in any cross-section of the cutting tool 20 taken parallel to the tongue plane PT and intersecting the adjustment tongue 46, the first passage plane PP1 may intersect the recess rear end surface 88.

In some embodiments of the present invention, the adjustment axis AA may be perpendicular to the first passage plane PP1.

For embodiments of the present invention in which the acute recess angle β1 has a range from ten to forty-five degrees, i.e., $10° \leq \beta 1 \leq 45°$, and the adjustment axis AA is perpendicular to the first passage plane PP1, it should be appreciated that the cutting insert 30 may be clamped against the adjustment tongue's shoulder surface 56 with a high level of stability and good resistance to axial cutting forces.

As shown in FIGS. 3 and 6, the recess rear end surface 88 may be located axially rearward of the tongue tip 50.

Also, as shown in FIG. 3, the recess rear end surface 88 may be spaced apart from the tongue tip 50 by a first channel CH1.

In some embodiments of the present invention, the first channel CH1 may communicate with the first inner passage 54.

Also, in some embodiments of the present invention, the first channel CH1 may open out to the forward envelope surface 24.

According to the present invention, the recess rear end surface 88 is formed on a first body sub-portion 90 of the cutting body 22, and the adjustment tongue 46 is integrally formed with the first body sub-portion 90 to have unitary one-piece construction therewith.

By virtue of the pivot axis AP, the adjustment tongue 46 may be hingedly connected to its associated first body sub-portion 90 by its tongue root 48.

In some embodiments of the present invention, the first body sub-portion 90 may be at least partially produced by means of additive manufacturing, whereby the adjustment recess 38 and its adjustment tongue 46 may be formed simultaneously.

Benefits of simultaneously producing the adjustment recess 38 and its adjustment tongue 46 include reducing the number of cutting body components and reducing manufacturing costs.

In some embodiments of the present invention, the insert receiving pocket 26 may be integrally formed with the first body sub-portion 90 to have unitary one-piece construction therewith. For such embodiments of the present invention, it should be appreciated that both the adjustment tongue 46 and the insert receiving pocket 26 may be integrally formed with the first body sub-portion 90 to have unitary one-piece construction therewith As shown in FIGS. 1 and 2, the cutting body 22 may have a plurality of insert receiving pockets 26 circumferentially spaced about the tool axis AT. For such embodiments of the present invention, the cutting body 22 may have an equal number of adjustment recesses 38 circumferentially spaced about the tool axis AT.

For embodiments of the present invention in which each adjustment recess 38 and its adjustment tongue 46 are located axially rearward of an associated insert receiving pocket 26, it should be appreciated that a high number of insert receiving pockets 26 and cutting inserts 30 may be circumferentially arranged around the cutting body's forward envelope surface 24, and the rotary cutting tool 20 may be particularly suitable for fine milling operations.

It should also be appreciated that axial displacement of the cutting inserts 30 in the forward direction DF may be performed to achieve axial alignment of their operative cutting edges 68$a$, thus promoting smooth surface finish of a workpiece during milling operations.

In some embodiments of the present invention, the rotary cutting tool 20 may include N insert receiving pockets 26 and an equal number of tangential cutting inserts 30 having a through bore diameter DTB of greater than 4.0 mm, whereby N is an integer, and N is equal to or greater than ten percent of the tool cutting diameter DTC, i.e., N≥0.10*DTC.

For embodiments of the present invention in which the cutting body 22 has a plurality of insert receiving pockets 26 circumferentially spaced about the tool axis AT, the cutting body 22 may have an equal number of first body sub-portions 90 circumferentially spaced about the tool axis AT.

In some embodiments of the present invention, the plurality of first body sub-portions 90 may be integrally formed so that the entire cutting body 22 has a unitary, one-piece construction.

Also, in some embodiments of the present invention, the entire cutting body 22 may be at least partially produced by means of additive manufacturing, whereby the plurality of first body sub-portions 90 may be formed simultaneously.

In other embodiments of the present invention (not shown), each first body sub-portion 90 may be in the form of a removably securable cartridge.

For embodiments of the present invention in which the cutting body 22 has a plurality of insert receiving pockets 26, the cutting body 22 may include a plurality of chip gullets 40 and a plurality of coolant ducts 70. For such embodiments of the present invention, additional benefits of producing the entire cutting body 22 by means of additive manufacturing include greater design flexibility of each coolant duct's path and a reduced number of manufacturing steps associated therewith.

In some embodiments of the present invention, each first body sub-portion 90 may be circumferentially delimited by two circumferentially adjacent chip gullets 40.

For embodiments of the present invention in which the cutting body 22 has a plurality of coolant ducts 70, the cutting body 22 may include an annular shaped coolant chamber 91 having a relatively large volume communicating with the plurality of coolant ducts 70. For such embodiments of the present invention, additional benefits of producing the entire cutting body 22 by means of additive manufacturing include reducing the overall weight thereof.

As shown in FIG. 3, the adjustment tongue 46 may have a tongue leading surface 92 facing in the direction of rotation RD.

Also, as shown in FIG. 3, the adjustment recess 38 may be delimited by a recess leading wall 94 facing against the direction of rotation RD.

In some embodiments of the present invention, the recess leading wall 94 may be transverse to the recess side surface 44.

Also, in some embodiments of the present invention, the first passage plane PP1 may intersect the recess leading wall 94.

As shown in FIG. 3, the recess leading wall 94 may be spaced apart from the tongue leading surface 92 by a second channel CH2. For such embodiments of the present invention, it should be appreciated that the recess leading wall 94 may overlap the tongue leading surface 92 in a rotational projection about the tool axis AT.

In some embodiments of the present invention, the second channel CH2 may communicate with the first inner passage 54.

Also, in some embodiments of the present invention, the second channel CH2 may open out to the forward envelope surface 24.

Further, in some embodiments of the present invention, the second channel CH2 may communicate with the first channel CH1.

Yet further, in some embodiments of the present invention, the second channel CH2 may have a maximum second channel width $WC2_{MAX}$ of less than 1.5 mm.

For embodiments of the present invention in which the second channel CH2 has a maximum second channel width $WC2_{MAX}$ of less than 1.5 mm, it should be appreciated that the risk of cutting chips entering the adjustment recess 38 and obstructing rotational displacement of the adjustment tongue 46 is minimized.

It should also be appreciated that each chip gullet 40 does not directly communicate with a circumferentially adjacent second channel CH2.

As shown in FIG. 3, the adjustment tongue 46 may have a tongue trailing surface 96 facing against the direction of rotation RD.

In some embodiments of the present invention, it should be appreciated that the maximum tongue width $WT_{MAX}$ may be measured between the tongue leading surface 92 and the tongue trailing surface 96.

As shown in FIG. 3, the adjustment recess 38 may be delimited by a recess trailing wall 98 facing in the direction of rotation RD.

In some embodiments of the present invention, the recess trailing wall 98 may be transverse to the recess side surface 44.

Also, in some embodiments of the present invention, the first passage plane PP1 may intersect the recess trailing wall 98.

As shown in FIG. 3, the recess trailing wall 98 may be spaced apart from the tongue trailing surface 96 by a third channel CH3. For such embodiments of the present invention, it should be appreciated that the recess trailing wall 98 may overlap the tongue trailing surface 96 in a rotational projection about the tool axis AT.

In some embodiments of the present invention, the third channel CH3 may communicate with the first inner passage 54.

Also, in some embodiments of the present invention, the third channel CH3 may open out to the forward envelope surface 24.

Further, in some embodiments of the present invention, the third channel CH3 may communicate with the first channel CH1.

Yet further, in some embodiments of the present invention, the third channel CH3 may have a maximum third channel width WC3$_{MAX}$ of less than 1.5 mm.

For embodiments of the present invention in which the third channel CH3 has a maximum third channel width WC3$_{MAX}$ of less than 1.5 mm, it should be appreciated that the risk of cutting chips entering the adjustment recess 38 and obstructing rotational displacement of the adjustment tongue 46 is minimized.

As shown in FIG. 3, the shoulder surface 56 may extend parallel to the pivot axis AP between the tongue trailing surface 96 and the tongue leading surface 92.

Also, as shown in FIG. 3, the shoulder surface 56 may extend axially forwardly as it extends towards the tongue leading surface 92.

In some embodiments of the present invention, the shoulder surface 56 may be planar.

As indicated by FIGS. 3 and 7, in any cross-section of the cutting tool 20 taken parallel to the tongue plane PT and intersecting the adjustment tongue 46, the first passage plane PP1 may intersect a recess front end surface 100 located axially forward of the recess rear end surface 88.

In some embodiments of the present invention, the recess front end surface 100 may be formed in a second inner passage 102 of the first body sub-portion 90 communicating with the first inner passage 54.

As indicated by FIG. 7, in the cross-section of the cutting tool 20 taken in the tongue plane PT, the second inner passage 102 may extend transversely with respect to the first passage plane PP1.

In some embodiments of the present invention, at least a portion of the second inner passage 102 may have an undercut in a direction parallel to the first passage plane PP1.

It should be appreciated that use of the term "undercut" throughout the description and claims refers to a configuration of the second inner passage 102 in which an imaginary straight line extending parallel to the first passage plane PP1 from a given sub-surface thereof intersects another sub-surface thereof.

As indicated by FIG. 7, in the cross-section of the cutting tool 20 taken in the tongue plane PT, the pivot axis AP may be located between the second inner passage 102 and the shoulder surface 56.

As shown in FIG. 2, the cutting body 22 may have a rearward envelope surface 104 extending rearwardly from the forward envelope surface 24.

In some embodiments of the present invention, as shown in FIG. 2, a portion of the rearward envelope surface 104 may taper in the rearward direction DR.

Also, in some embodiments of the present invention, as shown in FIG. 2, the rearward envelope surface 104 may intersect a rearward body end surface 106 having a second body diameter DB2 less than the first body diameter DB1. For such embodiments of the present invention, it should be appreciated that the rotary cutting tool 20 may be suitable for performing milling operations on workpieces with limited access, e.g., under protruding shoulders.

Further, in some embodiments of the present invention, no portion of the rearward envelope surface 104 may be located radially outside an imaginary cylinder defined by the first body diameter DB1. For such embodiments of the present invention, it should be appreciated that the rotary cutting tool 20 may be suitable for performing milling operations at cutting depths not limited by the cutting tool 20.

Although the present invention has been described to a certain degree of particularity, it should be understood that various alterations and modifications could be made without departing from the scope of the invention as hereinafter claimed.

What is claimed is:

1. A rotary cutting tool (20) rotatable about a tool axis (AT) in a direction of rotation (RD),
the tool axis (AT) defining a forward-to-rearward direction (DF, DR), and comprising:
a cutting body (22) having a forward envelope surface (24) and at least one insert receiving pocket (26) formed in the forward envelope surface (24), the insert receiving pocket (26) opening out at a forward body end (28) of the cutting body (22) and having a cutting insert (30) removably secured therein,
the forward envelope surface (24) also having an adjustment recess (38) located axially rearward of the insert receiving pocket (26),
the adjustment recess (38) including a radially outward facing recess side surface (44) and an adjustment tongue (46) extending axially rearwardly from a tongue root (48) to a tongue tip (50),
the adjustment tongue (46) being spaced apart from the recess side surface (44) by a first inner passage (54), and the tongue root (48) having a shoulder surface (56) facing in the forward direction (DF) and a pivot axis (AP), and
the adjustment tongue (46) also having opposing radially inner and radially outer tongue side surfaces (80, 82), and a tongue through bore (84) extending therebetween intersecting the radially inner and radially outer tongue side surfaces (80, 82),
wherein:
the cutting insert (30) is in clamping contact with the shoulder surface (56);
an adjustment screw (86) having an adjustment axis (AA) extends through the tongue through bore (84), traverses the first inner passage (54), and engages the recess side surface (44); and
rotation of the adjustment screw (86) in a first adjustment direction (DA1) about the adjustment axis (AA) causes rotational displacement of the adjustment tongue (46) about the pivot axis (AP) and axial displacement of the cutting insert (30) in the forward direction (DF),
and wherein:
in a cross-section of the cutting tool (20) taken in a radial plane (PR) containing the tool axis (AT) and intersecting the adjustment tongue (46), the first inner passage (54) has an imaginary first straight line (L1) disposed between the recess side surface (44) and the tongue's radially inner side surface (80), and the imaginary first straight line (L1) intersects a recess rear end surface (88) located axially rearward of the tongue's radially inner side surface (80),
the recess rear end surface (88) is formed on a first body sub-portion (90) of the cutting body (22), and
the adjustment tongue (46) is integrally formed with the first body sub-portion (90) to have unitary one-piece construction therewith.

2. The cutting tool (20) according to claim 1, wherein:
the recess rear end surface (88) is located axially rearward of the tongue tip (50).

3. The cutting tool (20) according to claim 1, wherein:
the forward envelope surface (24) is cylindrical, and
in an end view of the cutting body (22), the forward envelope surface (24) defines an imaginary first circle (C1) having a first body diameter (DB1).

4. The cutting tool (20) according to claim 3, wherein:
the cutting insert (30) has one operative cutting edge (68a) which defines a tool cutting diameter (DTC) upon rotation of the cutting tool (20) about the tool axis (AT), and
the tool cutting diameter (DTC) is greater than the first body diameter (DB1).

5. The cutting tool (20) according to claim 1, wherein:
in the cross-section of the cutting tool (20) taken in the radial plane (PR), the imaginary first straight line (L1) forms an acute recess angle (β1) with the tool axis (AT), and
the recess angle (β1) has a range from ten to forty-five degrees.

6. The cutting tool (20) according to claim 1, wherein:
the radial plane (PR) intersects the tongue through bore (84).

7. The cutting tool (20) according to claim 1, wherein:
a first passage plane (PP1) is disposed between the recess side surface (44) and the tongue's radially inner side surface (80),
a tongue plane (PT) perpendicular to the pivot axis (AP) intersects the adjustment tongue (46) and the first passage plane (PP1), and
in any cross-section of the cutting tool (20) taken parallel to the tongue plane (PT) and intersecting the adjustment tongue (46), the first passage plane (PP1) intersects the recess rear end surface (88).

8. The cutting tool (20) according to claim 7, wherein:
the adjustment axis (AA) is perpendicular to the first passage plane (PP1).

9. The cutting tool (20) according to claim 7, wherein:
in any cross-section of the cutting tool (20) taken parallel to the tongue plane (PT) and intersecting the adjustment tongue (46), the first passage plane (PP1) intersects a recess front end surface (100) located axially forward of the recess rear end surface (88).

10. The cutting tool (20) according to claim 9, wherein:
the recess front end surface (100) is formed in a second inner passage (102) of the first body sub-portion (90) communicating with the first inner passage (54),
in a cross-section of the cutting tool (20) taken in the tongue plane (PT), the second inner passage (102) extends transversely with respect to the first passage plane (PP1), and
at least a portion of the second inner passage (102) has an undercut in a direction parallel to the first passage plane (PP1).

11. The cutting tool (20) according to claim 1, wherein:
the cutting body (22) has a plurality of insert receiving pockets (26) circumferentially spaced about the tool axis (AT), and
the cutting body (22) has an equal number of first body sub-portions (90) circumferentially spaced about the tool axis (AT).

12. The cutting tool (20) according to claim 11, wherein:
the plurality of first body sub-portions (90) are integrally formed so that the entire cutting body (22) has a unitary, one-piece construction.

13. The cutting tool (20) according to claim 1, wherein:
the tongue through bore (84) is threaded, and
the adjustment screw (86) threadingly engages the tongue through bore (84) and non-threadingly engages the recess side surface (44).

14. The cutting tool (20) according to claim 1, wherein:
the recess rear end surface (88) is spaced apart from the tongue tip (50) by a first channel (CH1), and
the first channel (CH1) communicates with the first inner passage (54).

15. The cutting tool (20) according to claim 14, wherein:
the first channel (CH1) opens out to the forward envelope surface (24).

16. The cutting tool (20) according to claim 1, wherein:
the adjustment recess (38) is delimited by a recess trailing wall (98) facing in the direction of rotation (RD).

17. The cutting tool (20) according to claim 1, wherein:
the adjustment tongue (46) has a tongue leading surface (92) facing in the direction of rotation (RD).

18. The cutting tool (20) according to claim 17, wherein:
the adjustment recess (38) is delimited by a recess leading wall (94) facing against the direction of rotation (RD),
the recess leading wall (94) is spaced apart from the tongue leading surface (92) by a second channel (CH2), and
the second channel (CH2) has a maximum second channel width ($WC2_{MAX}$) of less than 1.5 mm.

19. The cutting tool (20) according to claim 18, wherein:
the second channel (CH2) communicates with the first inner passage (54).

20. The cutting tool (20) according to claim 18, wherein:
the second channel (CH2) opens out to the forward envelope surface (24).

21. The cutting tool (20) according to claim 1, wherein:
the forward envelope surface (24) has a chip gullet (40) located rotationally ahead of the insert receiving pocket (26),
the chip gullet (40) communicates with the insert receiving pocket (26) and opens out at the forward body end (28), and
the chip gullet (40) is rotationally spaced apart from the adjustment recess (38).

* * * * *